United States Patent
Soeda (10) Patent No.: US 9,897,036 B2
(45) Date of Patent: Feb. 20, 2018

(54) TIGHTENING STRUCTURE FOR CYLINDER HEAD BOLT

(71) Applicant: KAWASAKI JUKOGYO KABUSHIKI KAISHA, Kobe-shi, Hyogo (JP)

(72) Inventor: Akira Soeda, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 16 days.

(21) Appl. No.: 15/012,697

(22) Filed: Feb. 1, 2016

(65) Prior Publication Data

US 2016/0146149 A1 May 26, 2016

Related U.S. Application Data (63) Continuation of application No. PCT/JP2014/069719, filed on Jul. 25, 2014.

(30) Foreign Application Priority Data

Aug. 26, 2013 (JP) .................................. 2013-174584

(51) Int. Cl.
*F16B 39/24* (2006.01)
*F02F 1/24* (2006.01)
(Continued)

(52) U.S. Cl.
CPC ................ *F02F 1/24* (2013.01); *F16B 31/04* (2013.01); *F02F 2007/0041* (2013.01); *F02F 2007/0063* (2013.01)

(58) Field of Classification Search
CPC .. F16B 31/04; F16B 5/0266; F02F 2007/0063
(Continued)

(56) References Cited

U.S. PATENT DOCUMENTS 4,183,699 A * 1/1980 Donan, Jr. .......... E21D 21/0093
277/640
4,497,289 A 2/1985 Bortolussi
(Continued)

FOREIGN PATENT DOCUMENTS

DE      29720094      3/1999
EP      2599987      6/2013
(Continued)

OTHER PUBLICATIONS

Notification of Reason(s) for Rejection dated Nov. 1, 2016 for Corresponding Japanese Patent Application No. 2013-174584 and English Language Summary (5 pages).
(Continued)

*Primary Examiner* — Gary W Estremsky (57) ABSTRACT

A cylinder head bolt inserted into a cylinder head is threadingly engaged with an engine casing comprised of a cylinder and a crankcase to tighten the cylinder head and the engine casing firmly together. Between a rotation operating part, which is provided in a head of the cylinder head bolt, and an upper surface of the cylinder head, a plain washer and a spring member placed thereabove are interposed. The spring member is capable of exerting an axially acting spring force. A first frictional resistance between the rotation operating part and the spring member is so chosen to be lower than a second frictional resistance between the spring member and the plain washer and a third frictional resistance between the plain washer and a bearing surface on the cylinder head.

9 Claims, 4 Drawing Sheets

(51) Int. Cl.
  *F16B 31/04* (2006.01)
  *F02F 7/00* (2006.01)
(58) Field of Classification Search
  USPC ............ 411/371.2, 534, 544, 147; 123/193.3
  See application file for complete search history.

(56) References Cited

U.S. PATENT DOCUMENTS

| | | | | |
|---|---|---|---|---|
| 4,754,854 A * | 7/1988 | Adachi | ............ | F16D 55/22655 137/154 |
| 4,884,930 A * | 12/1989 | Dobbeler | ............ | F16B 5/0208 411/105 |
| 4,938,448 A * | 7/1990 | Shimazaki | ............ | F16F 15/08 248/635 |
| 4,984,938 A * | 1/1991 | Scott, Jr. | ............ | E21D 21/0093 405/259.1 |
| 5,105,777 A * | 4/1992 | Kronich | ............ | F02F 11/002 123/193.3 |
| 5,533,852 A * | 7/1996 | Matthews | ............ | F16B 43/002 411/428 |
| 5,709,516 A * | 1/1998 | Peterson | ............ | F16F 1/324 267/162 |
| 5,730,568 A * | 3/1998 | Lanham | ............ | B60B 3/16 411/428 |
| 5,746,558 A * | 5/1998 | Nygren, Jr. | ............ | F16B 5/025 411/110 |
| 6,435,791 B1 * | 8/2002 | Bydalek | ............ | B60B 3/145 411/371.2 |
| 6,729,819 B2 * | 5/2004 | Wallace | ............ | F16B 43/002 411/11 |
| 7,497,653 B2 * | 3/2009 | Harris | ............ | F16B 39/24 411/150 |
| 8,029,223 B2 * | 10/2011 | Mair | ............ | F16B 35/06 411/371.2 |
| 8,281,603 B2 * | 10/2012 | Johnson | ............ | F02K 9/62 411/424 |
| 8,459,919 B2 * | 6/2013 | Ehrler | ............ | F16B 39/26 411/149 |
| 8,568,107 B2 * | 10/2013 | Huttar | ............ | F04B 25/00 417/206 |
| 8,784,030 B2 * | 7/2014 | Grobecker | ............ | F16B 35/00 411/534 |
| 9,239,028 B2 * | 1/2016 | Mori | ............ | F02F 7/00 |
| 2003/0108404 A1 * | 6/2003 | Junkers | ............ | B25B 23/10 411/432 |
| 2003/0222422 A1 * | 12/2003 | Barila | ............ | B62D 7/18 280/93.512 |
| 2006/0192423 A1 * | 8/2006 | Song | ............ | B60B 27/0005 301/105.1 |
| 2011/0064539 A1 * | 3/2011 | Ghatikar | ............ | E04F 13/0837 411/371.2 |
| 2013/0133612 A1 | 5/2013 | Mori et al. | | |

FOREIGN PATENT DOCUMENTS

| | | |
|---|---|---|
| JP | 51-097603 | 8/1976 |
| JP | 61-136013 | 6/1986 |
| JP | 02-040949 | 3/1990 |
| JP | 3043382 | 11/1997 |
| JP | 2001-187911 | 7/2001 |
| JP | 3305615 | 7/2002 |
| JP | 2010-053694 | 3/2010 |

OTHER PUBLICATIONS

Extended and Supplementary Search Report dated Mar. 7, 2017 for Corresponding European Patent Application No. 14840184.7 (6 pages).
International Search Report for PCT/JP2014/069719, filed Jul. 25, 2014 (4 pages).
First Office Action dated Aug. 18, 2016 for Corresponding Chinese Patent Application No. 201480044543.1 with English language translation of the Search Report attached to the Office Action (7 pages).
English Translation of the International Preliminary Report on Patentability and Written Opinion of the International Searching Authority dated Mar. 10, 2016 for International PCT Patent Application No. PCT/JP2014/069719, filed Jul. 25, 2014 (11 pages).
Second Office Action dated Apr. 17, 2017 for Corresponding Chinese Patent Application No. 201480044543.1 with English Language Summary (5 pages).
Notification of Reason(s) for Rejection dated May 30, 2017 for Corresponding Japanese Patent Application No. 2013-174584 with English Language Summary (3 pages).

* cited by examiner

PRIOR ART

TIGHTENING STRUCTURE FOR CYLINDER HEAD BOLT

CROSS REFERENCE TO THE RELATED APPLICATION

This application is a continuation application, under 35 U.S.C § 111(a) of international application No. PCT/JP2014/069719, filed Jul. 25, 2014, which claims priority to Japanese patent application No. 2013-174584, filed Aug. 26, 2013, the entire disclosure of which is herein incorporated by reference as a part of this application.

BACKGROUND OF THE INVENTION

Field of the Invention

The present invention relates to a tightening structure for a cylinder head bolt, which is used in fastening or tightening a cylinder head bolt, inserted through a cylinder head, into either a cylinder or a crankcase, both forming respective parts of an engine casing, to thereby firmly connect the cylinder head with the engine casing.

Description of Related Art

Figure 1:
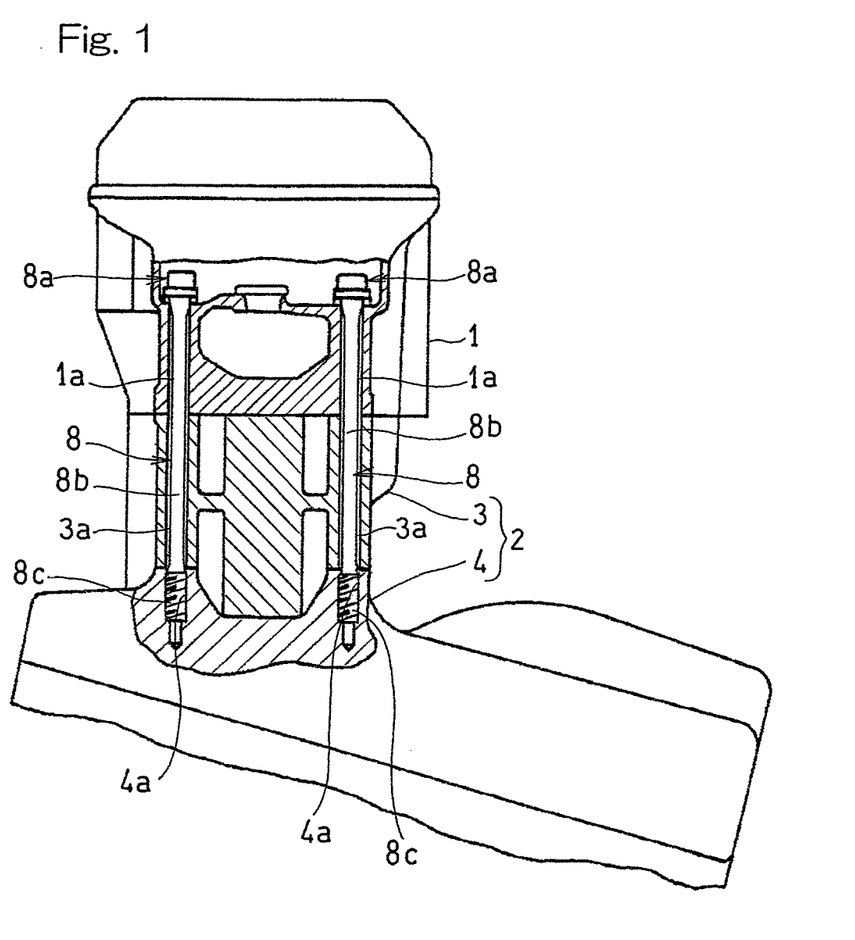
FIG. 1 is a schematic front elevational view, with a portion broken, showing a portion of an engine to which a tightening structure for a cylinder head bolt according to the present invention.

For example, In the assembly line of combustion engines for use in motorcycles, as shown in FIG. 1, when a cylinder head 1 is connected with an engine casing 2 including a cylinder 3 and a crankcase 4, a relatively elongated cylinder head bolt 8 is, after having been passed through an insertion hole 1a defined in the cylinder head 1 and then through a insertion hole 3a defined in the cylinder 3, threaded into a threaded hole 4a defined in the crankcase 4. By so doing, the cylinder head 1 and the crankcase 4 are connected together with the cylinder 3 interposed between the cylinder head 1 and the crankcase 4. In this connection, see the patent document 1 listed below.

As the cylinder head bolt 8 generally used in such a tightening structure as discussed above, as shown in FIG. 5 showing the conventional tightening structure, a tension bolt is utilized. The tension bolt 8 has at an upper end portion a rotation operating part 8a and at a lower end portion a male threaded region (shown in FIG. 1). Further, the tension bolt has a columnar part 8b situated intermediate between the upper and lower end portions. The outer diameter R2 of the columnar part 8b is smaller than the outer diameter R1 of the upper end portion and the outer diameter of the lower end portion. When this cylinder head bolt 8 in the form of the tension bolt discussed above is fastened, a large elongation is generated in the intermediate columnar part 8b of the smaller outer diameter. An axially acting force of a significant tension is brought about by the restoring force induced upon generation of such an elongation. The cylinder head and an engine casing 2 (shown in FIG. 1) is firmly connected together by such an axially acting restoring force. It is to be noted that a plain washer 9 is employed under a head of the cylinder head bolt 8.

Step-by-step measurement of the axially acting force generated in the cylinder head bolt 8 during the assemblage of the automotive engine results in increase of hours of work. Accordingly, the axial force of the cylinder head bolt 8 is controlled by the tightening torque that can be directly measured with a torque wrench for tightening the cylinder head bolt 8.

PRIOR ART LITERATURE

Patent Document 1: Japanese Patent No. 3305615

It has however been found that with the above discussed tightening structure, the axial force of the cylinder head bolt 8 is scattering considerably. As a result that the inventors of the present invention have committed a series of studies and experiments to find the cause of the scattering of the axial force, the following facts have been found. Specifically, with the conventional tightening structure for the cylinder head bolt 8 in the form of the tension bolt, a work to tighten such bolt 8 involves the following events (1) to (3): event (1) the bolt 8 and the plain washer 9 rotate together in the same direction while the plain washer 9 slips on a bearing face of the cylinder head 1, with the consequence that a sliding face occurs in an undersurface of the washer 9; event (2) the bolt 8 slidingly rotates relative to the plain washer 9 with the consequence that a sliding face occurs in a top face of the plain washer 9; and event (3) the sliding face changes from top to bottom, and vice versa. Those events (1) to (3) takes place randomly.

Since the sliding surface is erratic as discussed above, even though the tightening torque of the cylinder head bolt 8 is within the stipulated range, as compared with the case in which the sliding surface is stable, the axial force tends to take a value departing from the standard value. Therefore, the axial force varies so considerably as to result in loosening occurring in the cylinder head bolt 8.

The reason for the variation of the axial force is mentioned below. The cylinder head 1 is made of aluminum, and the cylinder head bolt 8 and the plain washer 9 are made of iron and are subjected to the surface treatment. Accordingly, material and surface roughness of frictional surfaces between these members 1, 8 and 9 are different from each other and, hence, surface conditions of the frictional surfaces are different from each other. As a result, frictional coefficients are different form each other, and the variation of the axial force is generated.

SUMMARY OF THE INVENTION

In view of the foregoing, the present invention has been devised to substantially eliminate the foregoing problems and inconveniences and is intended to provide a tightening structure for a cylinder head bolt, which is so designed as to enable a substantially constant axial force to be obtained.

In order to accomplish the foregoing object, the present invention provides a tightening structure for a cylinder head bolt configured to tighten a cylinder head to an engine casing by threadingly engaging a cylinder head bolt, which has been inserted through the cylinder head, into the engine casing including the cylinder and a crankcase. The tightening structure for the cylinder head bolt referred to above includes a plain washer and a spring member placed over the plain washer to exert a spring force in an axial direction of the bolt, and the plain washer and the spring member are disposed between a rotation operating part provided in a head of the cylinder head bolt and an upper surface of the cylinder head. In the tightening structure discussed above, a first frictional resistance between the rotation operating part of the cylinder head bolt and the spring member is chosen to be lower than a second frictional resistance between the spring member and the plain washer and a third frictional resistance between the plain washer and a bearing surface defined on the upper surface of the cylinder head. It is to be noted that the frictional resistance means a resistance force as measured under the static friction taking place and is determined depending on the contact surface area, material, surface roughness and others, but the contact surface area is dominantly controlling.

According to the above described tightening structure for the cylinder head bolt, when the cylinder head bolt is tightened, a high frictional resistance is developed between the spring member and the plain washer and also between the plain washer and the bearing surface of the cylinder head to such an extent as to make it difficult to slip. Therefore, the slip tends to occur between the rotation operating part of the cylinder head bolt and the spring member, due to the low frictional resistance. Since the site susceptible to slip is specified in the manner as described above, variation in axial force occurring in the cylinder head bolt after the tightening is reduced. It is to be noted that, while the insertion of the spring member in the bolt has hitherto been practiced, it has been for the purpose of preventing an undesirable loosening of the bolt. In contrast thereto, in the practice of the present invention, the use of the spring member is for the purpose of securing a constant axially acting force.

In one preferred embodiment of the present invention, the spring member referred to above may be in the form of a coned disc spring. Since the coned disc spring, when in a free state prior to the tightening of the cylinder head bolt, is held in circular linear contact with a round area of the bearing surface of the cylinder head bolt, the first frictional resistance is low. Also, at the time of completion of the tightening, the outer diameter of the coned disc spring is preferably set to a value greater than the outer diameter of the rotation operating part. Thus, the contact surface area between the rotation operating part and the coned disc spring is rendered to be small enough to reduce the first frictional resistance therebetween. Accordingly, the slip is apt to occur between the rotation operating part and the coned disc spring. Also, the coned disc spring is free from any sharp site which would bring about damages when the bearing surface of the cylinder head bolt and the plain washer are brought into contact with each other. Accordingly, there is such an advantage that, when a pressing force resulting from the tightening of the cylinder head bolt is applied, the coned disc spring is deformed smoothly to assume a flattened shape.

In another preferred embodiment of the present invention, the cylinder head bolt may be in the form of a tension bolt in which an intermediate columnar part has an outer diameter smaller than an upper end portion, provided with the rotation operating part, and a lower end portion provided with a male threaded region. Axial elongation is generated in the cylindrical columnar part having a small diameter, when the cylinder head bolt is being tightened, to thereby generate an axially acting force. The tension bolt will firmly connect the cylinder head and the engine casing together by the effect of a considerable tension brought about by a resilient force of restoration developed as a result of the axially acting force.

In a further preferred embodiment of the present invention, the cylinder head bolt may be threadingly engaged with the crankcase while having been passed through the cylinder. If the cylinder and the crankcase, both forming the engine casing, are provided as members separate from each other, threading the cylinder head bold into the crankcase is effective to connect the cylinder head and the crankcase together with the cylinder intervening therebetween.

In a still further preferred embodiment of the present invention, the cylinder head bolt may be formed integrally with a head that forms the rotation operating part. According to the use of the cylinder head bolt having the head formed integrally therewith, the cylinder head can be threadingly connected with the engine casing, with no need to use any stud bolt.

In a still further preferred embodiment of the present invention, where the cylinder head bolt having the head formed integrally therewith is used, the cylinder head bolt may be in the form of a collar head bolt having a disc shaped collar provided in a lower portion of the head, in which the outer diameter of the collar, when in a free state, is greater than the outer diameter of the spring member. According to the collar head bolt for the cylinder head bolt, when the cylinder head bolt is tightened through the head forming the rotation operating part, the spring member can be smoothly deformed into the flattened shape by the effect of a pressing force exerted by the disc shaped collar of the cylinder head bolt, with the outer diameter of the collar being greater than that of the spring member.

In a still further preferred embodiment of the present invention, the plain washer may have a layer of copper plating applied to a ferrous material. According to the use of the plain washer having the layer of copper plating applied to a ferrous material, the spring member is bitten by the soft copper plating applied to the plain washer and therefore, the plain washer hardly slides relative to the spring member. As a result, the site at which the slip takes place can be further assuredly set up at a position between the rotation operating part of the cylinder head bolt and the spring member.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described with particular reference to the accompanying drawings.

Figure 2A:
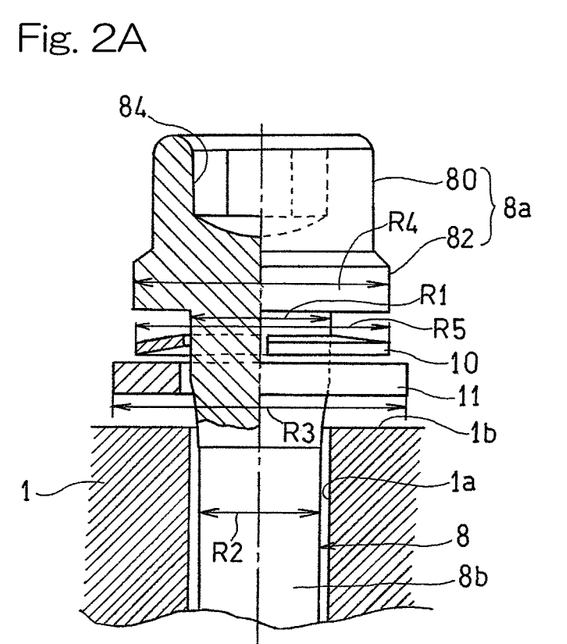
FIG. 2A is a schematic sectional view of an important portion of the tightening structure for the cylinder head bolt according to a first preferred embodiment of the present invention, with the tightening structure shown in a condition before being tightened.

According to a first preferred embodiment of the present invention shown in FIG. 1, a conventionally used cylinder head bolt 8 is used to connect a cylinder head 1 and a cylinder 3 to a crankcase 4. As shown in FIG. 2A, this cylinder head bolt is a tension bolt including a rotation operating part 8a and a shaft shaped member, in which the intermediate columnar part 8b has an outer diameter R2 smaller than the outer diameter R1 of an upper end portion, provided with the rotation operating part 8a, and the outer diameter of a lower end portion, which is provided with a male threaded region 8c (shown in FIG. 1). It is to be noted that the outer diameter of the male threaded region 8c formed in the lower end portion of the shaft shaped member of the cylinder head bolt 8 is, although not shown, substantially equal to the outer diameter R1 of the upper end portion.

Also, the cylinder head bolt 8 referred to above is a so-called collar head bolt, in which a head 80 is formed integrally with the upper end portion of the shaft shaped member and a disc shaped collar 82 is defined below the head 80. The head 80 has a hexagonal hole 84 defined therein for accommodating a torque wrench for rotation operating purpose. The head 80 and the collar 82 altogether constitute the rotation operating part 8a. It is to be noted that a plain washer 11 is made of a ferrous material and has a surface that is copper plated.

In this tightening structure, between the collar 82, provided in a lower portion of the head 80 of the cylinder head bolt 8, and an upper face of the cylinder head 1, a plain washer 11 and a coned disc spring 10 overlapping the plain washer 11 are disposed. The coned disc spring 10 forms a spring member that is deformed to represent a flat shape when the cylinder head bolt 8 is tightened, but exerts a spring force in an axial direction by the effect of a resilient force of restoration thereof. The outer diameter R4 of the collar 82 of the cylinder head bolt 8, that is, the outer diameter R4 of the rotation operating part 8a is so stipulated as to be slightly greater than the diameter R5 of the coned disc spring 10 in a free state before tightening takes place, but to be smaller than the outer diameter R3 of the plain washer 11.

When the cylinder head 1 shown in FIG. 1 is to be fastened to a crankcase 4 of an engine casing 2, after the shaft shaped member has been inserted into an insertion hole 1a, defined in the cylinder head 1, and also into an insertion hole 3a, defined in the cylinder 3, the male threaded region 8c of the shaft shaped member is threaded into a threaded hole 4a defined in the crankcase 4. At this time, by turning a torque wrench, then engaged with the rotation operating part 8a of the cylinder head bolt 8, the cylinder head bolt 8 is threadingly driven. The magnitude of the driving torque of the cylinder head bolt 8 is displayed in the torque wrench. This driving torque is proportional to the axially acting force.

Figure 2B:
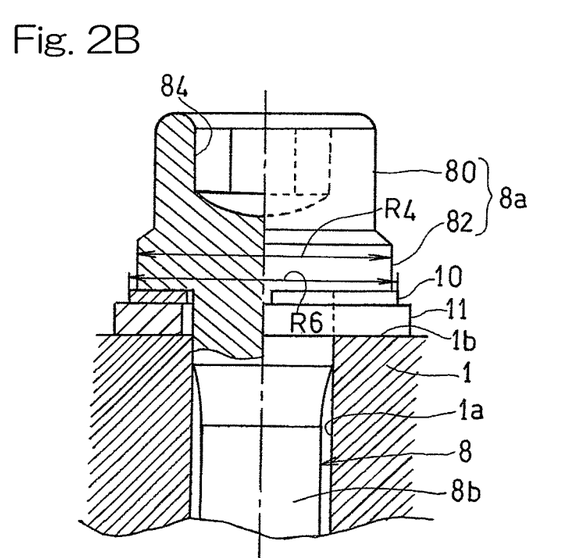
FIG. 2B is a schematic sectional view of the important portion of the tightening structure for the cylinder head bolt shown in a condition after having been tightened.

At the termination of tightening of the cylinder head bolt 8, at which the axially acting force is generated in the cylinder head bolt 8, the coned disc spring 8, then pressed from top and bottom, is deformed to represent a flat shape as shown in FIG. 2B. As a result, the outer diameter R6 of the coned disc spring 8 consequently increases to a value greater than the outer diameter R4 of the collar 82 of the cylinder head bolt 8. The outer diameter R3 of the plain washer 11 is furthermore greater than the outer diameter R6 of the coned disc spring 10 then having been flattened. As a result thereof, the contact surface area S2 between the coned disc spring 10 and the plain washer 11 becomes greater than the contact surface area S1 between the collar 82 and the coned disc spring 10. Also, the contact surface area S3 between the plain washer 11 and a bearing surface 1b on an upper face of the cylinder head 1 become furthermore greater than the contact surface area S2 between the plain washer 11 and the coned disc spring 10. In other words, the relationship of S1<S2<S3 thus establishes.

Along with this relationship, the frictional resistance between the coned disc spring 10 and the plain washer 11 and the frictional resistance between the plain washer 11 and the cylinder head 1 increase correspondingly, resulting in a slip taking place hardly. It is however to be noted that the contact surface area S2 may be made larger than the contact surface area S3 to establish the relationship of S1<S3<S2. Since the frictional resistances referred to above are affected by the material and the surface roughness besides the contact surface area, considering those influences the magnitude of frictional resistance among the collar 82, the coned disc spring 10 and the plain washer 11 is to be specified.

The slip referred to above is apt to occur between the coned disc spring 10 and the rotation operating part 8a of the cylinder head bolt 8, due to a lower frictional resistance because of its small contact surface area. As the site where the slip occurs in the manner described above is identified, the variation in axially acting force induced in the cylinder head bolt 8 after the latter has been tightened is rendered to be small. It is to be noted that although the interposition of a spring member such as the coned disc spring 10 on the bolt has hitherto been made, the present invention makes use of the spring member for the purpose of obtaining a constant axially acting force whereas according to the conventional practice the spring member has hitherto been used for preventing loosening of the bolt.

In the practice of this preferred embodiment now under discussion, the coned disc spring 10 is employed as the spring member. The coned disc spring 10, when in the free state before the cylinder head bolt 8 is tightened, has a round inner peripheral portion held in circular linear contact with the undersurface of the collar 82 that is a bearing surface for the cylinder head bolt 8. Therefore, the contact surface area between the coned disc spring 10 and the collar 82 is small. Along with the small contact surface area, the frictional resistance between the coned disc spring 10 and the collar 82 is rendered to be low, and therefore, the cylinder head bolt 8 during execution of the tightening work is apt to rotate while sliding. Also, the coned disc spring 10 has no sharp site which may, when the coned disc spring 10 contacts the bearing surface of the cylinder head bolt 8 and the plain washer 11, give rise to damages. Accordingly, such an advantage can be appreciated that, when a pressing force is applied as a result of tightening of the cylinder head bolt 8, it is crushed from top and bottom to eventually deform smoothly into a flat shape.

As the cylinder head bolt 8, a tension bolt is employed in which the intermediate columnar part 8b of the shaft shaped member has the outer diameter R2 that is smaller than the outer diameter R1 of the upper end portion of the shaft shaped member, provided with the rotation operating part 8a, and the outer diameter of the lower end portion thereof provided with the male threaded region 8c (best shown in FIG. 1). In this tension bolt, the intermediate columnar part 8b having the small outer diameter, when the cylinder head bolt 8 is tightened, will elongate considerably in the axial direction. This tension bolt serves to firmly connect the cylinder head 1, shown in FIG. 1, and the engine casing 2 together by means of the axially acting force generated when tensioned by the resilient force of restoration.

In the embodiment now under discussion the cylinder 3 and the crankcase 4, both cooperating to form the engine casing 2, are members separate from each other. The cylinder head bolt 8 is, after having been inserted through the insertion hole 1a in the cylinder head 1 and then through the insertion hole 3a in the cylinder 3, threaded into the threaded hole 4a defined in the crankcase 4. Accordingly, the cylinder head 1 and the crankcase 4 can be connected together in a fashion with the cylinder 3 intervening therebetween. It is to be noted that where the engine casing 2 is of a type in which the cylinder 3 and the crankcase 4 are integrally formed, the cylinder head bolt 8 having inserted into the insertion hole in the cylinder head 1 is threaded into a threaded hole, provided in the cylinder 3, to connect the cylinder head 1 together with the engine casing 2.

Since the head 80 of the cylinder head bolt 8, forming the rotation operating part 8a, is integrally formed in the upper end portion of the shaft shaped member, the cylinder head 1 and the engine casing 2 can be connected together even without any stud bolt used. In addition thereto, the cylinder head bolt 8 is in the form of a collar head bolt in which the collar 82 of a disc shape is provided in a lower portion of the head 80 and the outer diameter R4 of the collar 82 is chosen to be greater than the outer diameter R5 of the coned disc spring 10 in the free state. Accordingly, when tightening of the cylinder head bolt 8 is carried out through the rotation operating part 8a including the head 80, the coned disc spring 10 can be smoothly flattened to represent the flat shape by the effect of the pressing force exerted by the disc shaped collar 82 of the cylinder head bolt 8, with the outer diameter R4 being greater than the outer diameter R5 of the coned disc spring 10.

Also, in the practice of the preferred embodiment, the plain washer 11 is made of a ferrous material and has a copper plated surface. This plain washer 11 would hardly slide relative to the coned disc spring 10, since the coned disc spring 10 is bitten into a soft copper plating applied to the plain washer 11. Accordingly, the site at which the slip takes place can be further assuredly set up at a position between the rotation operating part 8a of the cylinder head bolt 8 and the coned disc spring 10.

Figure 3A:
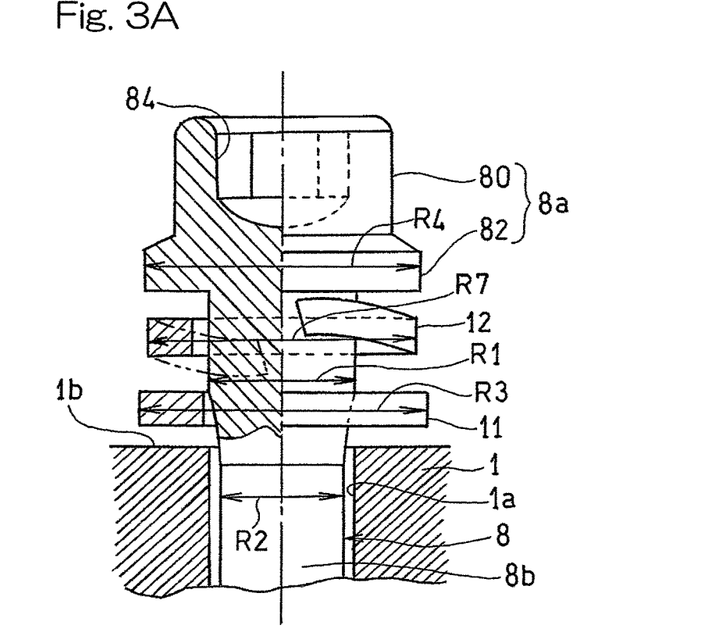
FIG. 3A is schematic sectional view of an important portion of the tightening structure for the cylinder head bolt according to a second preferred embodiment of the present invention, with the tightening structure shown in a condition before being tightened.
Figure 3B:
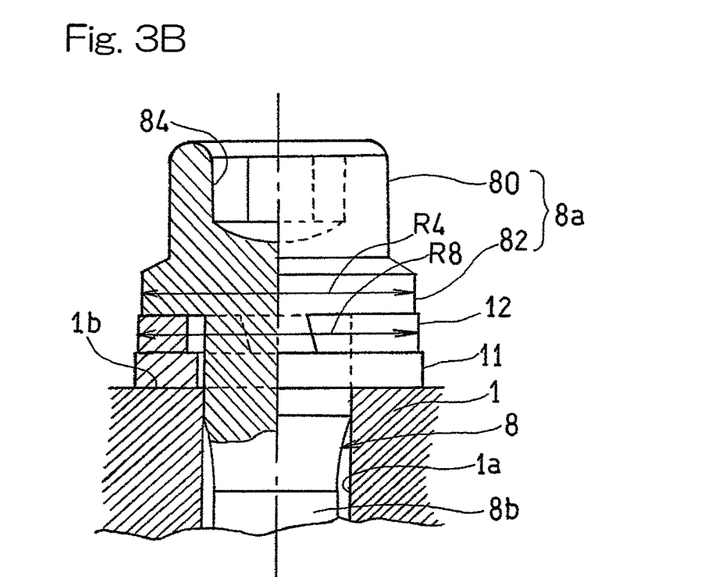
FIG. 3B is a schematic sectional view of the important portion of the tightening structure for the cylinder head bolt shown in a condition after having been tightened.

FIGS. 3A and 3B illustrate schematic longitudinal sectional views of a second preferred embodiment of the present invention. FIG. 3A shows the cylinder head bolt tightening structure in a condition before being tightened, and FIG. 3B shows it in a condition after having been tightened. In those figures, component parts shown in and described with reference to one of FIGS. 3A and 3B, which are similar to component parts shown in and described with reference to the other of FIGS. 2A and 2B, are designated by like reference numerals and, therefore, description of those shown in either of those figures are not reiterated for the sake of brevity. The cylinder bolt tightening structure shown in FIGS. 3A and 3B according to this second embodiment differs from that according to the previously discussed first preferred embodiment in that as a spring member, the coned disc spring 10 employed in the first embodiment is replaced with a spring washer 12 of an open helix configuration with an upper curved end and a lower curved end spaced apart from each other as shown in FIG. 3A.

In the practice of the second preferred embodiment, between the collar 82 provided in the lower portion of the head 80 of the cylinder head bolt 8 and the upper face of the cylinder head 1, the plain washer 11 and the spring washer 12 overlapping the plain washer 11 are disposed. The spring washer 12 forms the spring member capable of being deformed to represent a flat shape, when the cylinder head bolt 8 is tightened, to thereby exert a resilient force of restoration with which an axially acting spring force is generated. As shown in FIG. 3A, the outer diameter R4 of the collar 82 of the cylinder head bolt 8 is so chosen to be slightly greater than the outer diameter R7 of the spring washer 12 in the free state before the cylinder head bolt 8 is tightened, but smaller than the outer contour R3 of the plain washer 11.

Accordingly, even in the tightening structure according to this second embodiment, effects similar to those afforded by the previously described first embodiment can be obtained. Specifically, at the time of completion of the bolt tightening which is accomplished by tightening the cylinder head bolt 8 to allow the cylinder head bolt 8 to exert the axially acting force, as shown in FIG. 3B, the spring washer 12 is pressed from top and bottom to deform into the flat shape. Thus, the outer diameter R8 of the spring washer 12 is consequently increased to a value greater than the outer diameter R4 of the collar 82 of the cylinder head bolt 8. As a result, the contact surface area between the spring washer 12 and the plain washer 11 is increased and, correspondingly, the frictional resistance developed between the spring washer 12 and the plain washer 11 is increased to such an extent that the slip will hardly occur. The slip referred to above is apt to occur between the rotation operating part 8a of the cylinder head bolt 8 and the spring washer 12, due to the small contact surface area, that is, a low frictional resistance.

With the site of slip identified as discussed above, the variation in the axially acting force induced in the cylinder head bolt 8 after the latter has been tightened is reduced. It is to be noted that, even in the practice of the second embodiment, the spring washer 12 is utilized for maintaining the axially acting force, induced in the bolt, at a constant value in contrast to the conventional practice in which the spring washer is used solely for preventing loosening of the bolt.

Figure 4:
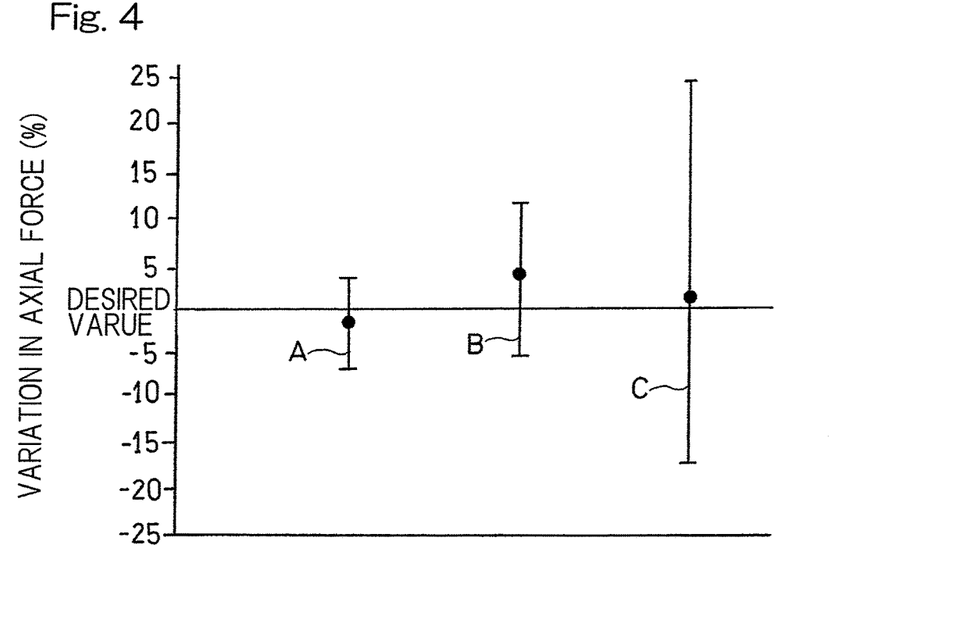
FIG. 4 is a chart showing variations of an axially acting force of the cylinder head bolt which are exhibited as a result of experiments conducted on the first and second preferred embodiments of the present invention.
Figure 5:
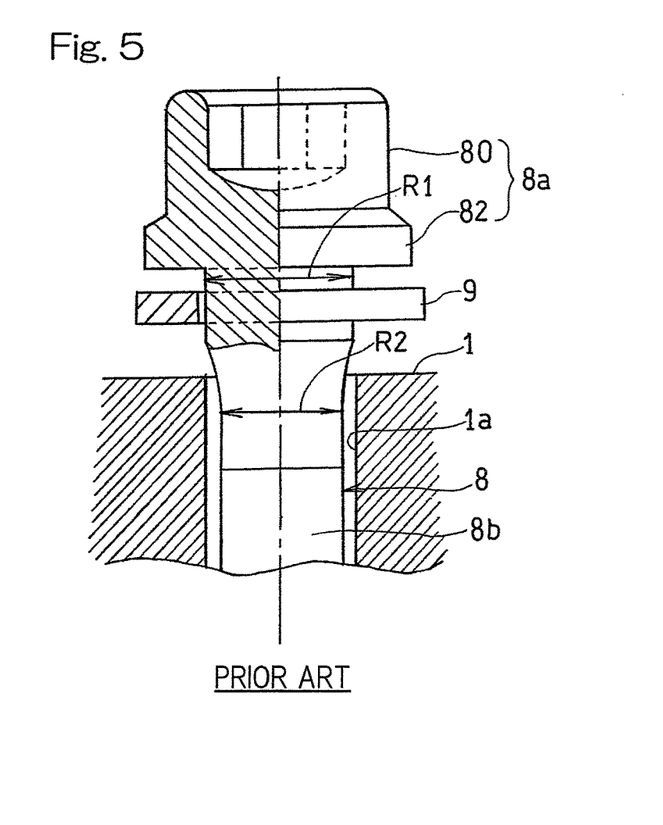
FIG. 5 is a schematic longitudinal sectional view showing the conventional tightening structure for the cylinder head bolt.

FIG. 4 illustrates a chart showing variations of the axially acting force of the cylinder head bolt which are exhibited as a result of experiments conducted on the first and second preferred embodiments. Specifically, in the chart of FIG. 4, a range A represents a result of experiment conducted on the previously described first embodiment whereas a range B represents a result of experiment conducted on the previously described second embodiment. For comparison purpose, a result of experiment conducted on the conventional tightening structure shown in FIG. 5 is shown by a range C in the chart of FIG. 4. In those ranges A, B and C, a blackened dot represents the average value. All of the cylinder head bolts 8 used during the experiments have been tightened to a constant torque. As FIG. 4 makes it clear, with the tightening structure designed according to the first embodiment, it has been confirmed that the variation of the axially acting force generated by the cylinder head bolt 8 was considerably reduced as compared with that exhibited by the conventional tightening structure. Also, although the tightening structure designed according to the second preferred embodiment presented somewhat larger variation occurring in the axially acting force generated by the cylinder head bolt 8 as compared with that exhibited by the tightening structure according to the first preferred embodiment, it is clear that the variation of the axially acting force generated by the cylinder head bolt 8 is substantially reduced as compared with the conventional tightening structure.

The present invention can be equally applied to a tightening structure for a stud bolt, In such case, a nut threadingly engaged with the upper end portion of the stud bolt forms the rotation operating part referred to in connection with the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Cylinder head
1b . . . Bearing surface
2 . . . Engine casing
3 . . . Cylinder
4 . . . Crankcase
8 . . . Cylinder head bolt
8a . . . Rotation operating part
8b . . . Columnar part
8c . . . Male threaded region
80 . . . Head
82 . . . Collar
10 . . . Coned disc spring (Spring member)
11 . . . Plain washer
12 . . . Spring washer (Spring member)

What is claimed is:

1. An engine comprising:
an engine casing including a cylinder and a crankcase;
a cylinder head connected to an upper surface of the engine casing;
a cylinder head bolt to tighten the cylinder head to the engine casing, the cylinder head bolt being inserted through the cylinder head and being threadingly engaged into the engine casing;
a plain washer; and
a spring member comprising a coned disc spring, and being placed over the plain washer to exert a spring force in an axial direction of the bolt, the plain washer and the spring member being disposed between a rotation operating part provided in a head of the cylinder head bolt and an upper surface of the cylinder head, and a diameter of the spring member having a value greater than an outside diameter of the rotation operating part at a time of completion of tightening, wherein
a first frictional resistance between the rotation operating part of the cylinder head bolt and the spring member is chosen to be lower than a second frictional resistance between the spring member and the plain washer and a third frictional resistance between the plain washer and a bearing surface defined on the upper surface of the cylinder head.

2. The engine as claimed in claim 1, wherein the cylinder head bolt comprises a tension bolt in which an intermediate columnar part has an outer diameter smaller than an upper end portion, provided with the rotation operating part, and a lower end portion provided with a male threaded region.

3. The engine as claimed in claim 1, wherein the cylinder head bolt is threadingly engaged with the crankcase while having been passed through the cylinder.

4. The engine as claimed in claim 1, wherein the cylinder head bolt is formed integrally with a head that forms the rotation operating part.

5. The engine as claimed in claim 1, wherein the plain washer has a layer of copper plating applied to a ferrous material.

6. An engine comprising:
an engine casing including a cylinder and a crankcase;
a cylinder head connected to an upper surface of the engine casing;
a cylinder head bolt to tighten the cylinder head to the engine casing, the cylinder head bolt being inserted through the cylinder head and being threadingly engaged into the engine casing, the cylinder head bolt being formed integrally with a head that forms a rotation operating part, and the cylinder head bolt comprising a collar head bolt having a disc shaped collar provided in a lower portion of the head;
a plain washer; and
a spring member placed over the plain washer to exert a spring force in an axial direction of the bolt, the plain washer and the spring member being disposed between the rotation operating part and an upper surface of the cylinder head, wherein
an outer diameter of the disc shaped collar, when in a free state, is greater than an outer diameter of the spring member, and a first frictional resistance between the rotation operating part of the cylinder head bolt and the spring member is chosen to be lower than a second frictional resistance between the spring member and the plain washer and a third frictional resistance between the plain washer and a bearing surface defined on the upper surface of the cylinder head.

7. An engine comprising:
an engine casing including a cylinder and a crankcase;
a cylinder head connected to an upper surface of the engine casing;
a cylinder head bolt with a disc shaped collar provided in a lower portion of the head bolt to tighten the cylinder head to the engine casing, the cylinder head bolt being inserted through the cylinder head and being threadingly engaged into the engine casing;
a plain washer; and
a spring washer, with an open helix configuration where an upper end of the spring washer has a curved contact surface and a lower end of the spring washer has a curved contact surface, placed over the plain washer to exert a spring force in an axial direction of the spring washer in the cylinder head bolt, the plain washer and the spring washer being disposed between the disc shaped collar provided in the head of the cylinder head bolt and an upper surface of the cylinder head, wherein a first frictional resistance between the disc shaped collar of the cylinder head bolt and the spring washer is chosen to be lower than a second frictional resistance between the spring washer and the plain washer and a third frictional resistance between the plain washer and a bearing surface defined on the upper surface of the cylinder head.

8. The engine as claimed in claim 7, wherein the spring washer diameter at the time of completion of tightening is set to a value greater than the outer diameter of the disc shaped collar on the cylinder head bolt.

9. The engine as claimed in claim 8, where a diameter of the plain washer is set to a value greater than the outer diameter of the spring washer when the helix configuration is collapsed.

* * * * *